US012269908B2

(12) United States Patent
Wilker et al.

(10) Patent No.: US 12,269,908 B2
(45) Date of Patent: Apr. 8, 2025

(54) LARGE SCALE PRODUCTION OF CATECHOL-CONTAINING POLYMERS

(71) Applicant: Purdue Research Foundation, West Lafayette, IN (US)

(72) Inventors: Jonathan J. Wilker, West Lafayette, IN (US); Samuel L. Huntington, Greenville, SC (US); Amelia A. Putnam, Mansfield, GA (US)

(73) Assignee: Purdue Research Foundation, West Lafayette, IN (US)

( * ) Notice: Subject to any disclaimer, the term of this patent is extended or adjusted under 35 U.S.C. 154(b) by 456 days.

(21) Appl. No.: 17/787,190

(22) PCT Filed: Dec. 17, 2020

(86) PCT No.: PCT/US2020/065462
§ 371 (c)(1),
(2) Date: Jun. 17, 2022

(87) PCT Pub. No.: WO2021/127079
PCT Pub. Date: Jun. 24, 2021

(65) Prior Publication Data
US 2023/0066557 A1    Mar. 2, 2023

Related U.S. Application Data

(60) Provisional application No. 62/951,005, filed on Dec. 20, 2019.

(51) Int. Cl.
*C08F 212/08*    (2006.01)
*C08F 212/14*    (2006.01)

(52) U.S. Cl.
CPC .......... *C08F 212/08* (2013.01); *C08F 212/24* (2020.02)

(58) Field of Classification Search
None
See application file for complete search history.

(56) References Cited

U.S. PATENT DOCUMENTS 8,759,465 B2 *  6/2014  Wilker ............... C08K 5/37
                                                    525/333.5
2009/0036611 A1 *  2/2009  Wilker ............ C08F 212/26
                                                    525/328.5
2015/0376395 A1   12/2015  Tao et al.

FOREIGN PATENT DOCUMENTS

WO    2007127225 A2    11/2007

OTHER PUBLICATIONS

Westwood, G. et al., Simplified Polymer Mimics of Cross-Linking Adhesive Proteins. Macromolecules 2007, 40 (11), 3960-3964.
(Continued)

*Primary Examiner* — Richard A. Huhn
(74) *Attorney, Agent, or Firm* — Purdue Research Foundation (57) ABSTRACT

This invention relates to a method for manufacturing a catechol-containing co-polymer through a suspension polymerization or a solution polymerization process. In some illustrative embodiments, this disclosure relates to a process of a free radical suspension polymerization for large-scale manufacturing catechol-containing copolymers. In some other illustrative embodiments, this disclosure relates to a solution polymerization of free radical, cationic, or anionic process for large-scale manufacturing catechol-containing copolymers. The process and the product thereof are within the scope of this disclosure.

18 Claims, 6 Drawing Sheets

(56) References Cited

OTHER PUBLICATIONS

Wilker, J.J., Redox and Adhesion on the Rocks. Nat. Chem. Biol., 2011, 7 (9), 579-580.
Matos-Pérez, C.R. et al., Polymer Composition and Substrate Influences on the Adhesive Bonding of a Biomimetic, Cross-Linking Polymer. J. Am. Chem. Soc. 2012, 134 (22), 9498-9505.
Percec, V. et al., Metal-Catalyzed "Living" Radical Polymerization of Styrene Initiated with Arenesulfonyl Chlorides. From Heterogeneous to Homogeneous Catalysis. Macromolecules 1996, 29 (10), 3665-3668.
Arita, T. et al., RAFT-Polymerization of Styrene up to High Pressure: Rate Enhancement and Improved Control. Macromol. Rapid Commun. 2004, 25 (15), 1376-1381.
Hawker, C.J. et al., New Polymer Synthesis by Nitroxide Mediated Living Radical Polymerizations. Chem. Rev. 2001, 101 (12), 3661-3688.
Yuan, H.G. et al., Suspension Polymerization. J. Macromol. Sci., Part C: Polymer Reviews, 1991, 31 (2-3), 215-299.
Ahmed, S. M. Effects of Agitation, and the Nature of Protective Colloid on Particle Size During Suspension Polymerization. Journal of Dispersion Science and Technology. 1984, 5 (3-4), 421-432.
Leibig, D. et al., Anionic Polymerization of Vinylcatechol Derivatives: Reversal of the Monomer Gradient Directed by the Position of the Catechol Moiety in the Copolymerization with Styrene. Macromolecules. Jun. 29, 2016, vol. 49, No. 13, 4792-4801.
North, M. et al., High Strength Underwater Bonding with Polymer Mimics of Mussel Adhesive Proteins. ACS Appl. Mater. Interfaces. 2017, 9, 7866-7872.
Cantergiani, E. et al., Characterisation of the Aroma of Green Mexican Coffee and Identification of Mouldy/Earthy Defect. Eur. Food Res. Technol. 2001, 212 (6), 648-657.
Grosch, W. et al., Sensory Studies on the Key Odorants of Roasted Coffee. ACS Symp. Ser. 2000, 754, 202-209.
Clarke, R.J. Technology III: Instant Coffee. in Coffee: Recent Developments, Chapter 6, 2001; vol. II, pp. 125-139.
Bernini, R. et al., A Convenient and Safe O-Methylation of Flavonoids with Dimethyl Carbonate (DMC). Molecules 2011, 16 (2), 1418-1425.
Jenkins, C.L. et al., Molecular Weight Effects upon the Adhesive Bonding of a Mussel Mimetic Polymer. ACS Appl. Mater. Interfaces 2013, 5 (11), 5091-5096.
White, J.D. et al. Underwater Bonding with Charged Polymer Mimics of Marine Mussel Adhesive Proteins. Macromolecules 2011, 44, 5085-5088.
Cunningham, M.F. et al., Measuring the Effects of Dissolved Oxygen in Styrene Emulsion Polymerization. Polymer 2000, 41, (14), 5385-5392.
Zuo, L. et al., An Efficient Method for Demethylation of Aryl Methyl Ethers. Tetrahedron Letters 2008, 49 (25), 4054-4056.
Ferhan, M. et al., A New Method for Demethylation of Lignin from Woody Biomass Using Biophysical Methods. J. Chem. Eng. Process Technol. 2013, 4 (5), 1000160.
International Search Report and Written Opinion issued by the ISA/US, Commissioner for Patents, Feb. 25, 2021, for International PCT Application No. PCT/US2020/065462.
Kanagasabapathy, S. et al., Reversible Addition-Fragmentation Chain-Transfer Polymerization for the Synthesis of Poly(4-acetoxystyrene) and Poly(4-acetoxystyrene)-block-polystyrene by Bulk, Solution and Emulsion Techniques. Macromolecular Rapid Communications. Sep. 5, 2001, vol. 22, No. 13, 1076-1080.
Li, BT. et al., Synthesis of Linear Isotactic-rich poly(p-methylstyrene) via cationic polymerization coinitiated with AlCl3. Polymer. Aug. 2, 2012, vol. 53, No. 17, 3726-3734.

* cited by examiner

LARGE SCALE PRODUCTION OF CATECHOL-CONTAINING POLYMERS

CROSS-REFERENCE TO RELATED APPLICATIONS

The present U.S. patent application is a national stage entry under 35 U.S.C. § 371 (b) of International Application No. PCT/US2020/065462, filed on Dec. 17, 2020, which relates to and claims the priority benefit of U.S. Provisional Application Ser. No. 62/951,005, filed Dec. 20, 2019, the content of which is hereby incorporated by reference in its entirety.

GOVERNMENT RIGHTS

This invention was made with Government support under N000141310327, N000141612709, N000141912342, and N000141812117, awarded by the Office of Naval Research. The Government has certain rights in the invention.

TECHNICAL FIELD

This invention relates to a method for manufacturing a catechol-containing copolymer through a suspension polymerization process, particularly to a suspension polymerization process of free radical polymerization or anionic polymerization chemistry. The process and the product thereof are within the scope of this disclosure.

BACKGROUND

This section introduces aspects that may help facilitate a better understanding of the disclosure. Accordingly, these statements are to be read in this light and are not to be understood as admissions about what is or is not prior art.

There has been a wealth of recent interest in the development of adhesive materials that function in wet or underwater environments. In particular, much of this focus has been placed on adhesive development for biomedical applications, as a suitable biomedical adhesive could have an immense impact on health and the economy. Each year, over 230 million major surgeries are performed worldwide, and over 12 million traumatic wounds are treated in the U.S. alone. Approximately 60% of these wounds are closed using mechanical methods such as sutures and staples. Sutures and staples have several disadvantages relative to adhesives, including patient discomfort, higher risk of infection, and the inherent damage to surrounding healthy tissue.

Current FDA-approved adhesives and sealants face several challenges. First, numerous adhesives exhibit toxic characteristics. For example, cyanoacrylate-based adhesives like DERMABOND® and SURGISEAL® can only be applied topically due to carcinogenic degradation products. Fibrin sealants like TISSEEL and ARTISS are derived from blood sources and therefore carry the potential for blood-borne pathogen transmission. Poly(ethylene glycol) (PEG) adhesives are approved as a suture sealants but, due to intense swelling when wet, have the potential to cause moderate inflammatory responses. TISSUGLU®, a following subcutaneous implantation, and, in clinical trials, seroma formation occurred in 22% of patients. More important, however, is that most of these adhesives do not possess strong adhesion in an excessively wet environment and are not approved for application in wound closure. In fact, many of these materials specifically advise to dry the application area as much as possible.

In approaching the challenge of developing a strong adhesive for wet applications, many researchers have been inspired by natural glues. Specifically, underwater application and bonding has been demonstrated with materials based on organisms such as sandcastle worms and mussels. Both of these organisms produce proteins containing the non-canonical amino acid 3,4- dihydroxyphenylalanine (DOPA), which has been shown to provide adhesion strength, even in wet environments. In the case of a mussel-mimetic polymer, underwater application was achieved by dissolving the polymer in a chloroform/methanol solution to maintain phase separation from the aqueous environment. The use of toxic organic solvents, however, is not appropriate for biomedical applications.

The need for a strong bonding, wet or dry setting adhesives for construction, biomedical, or underwater applications has encouraged the development of a unique polymer system. Poly[styrene-co-(3,4-dihydroxystyrene)], or poly (catechol-styrene), has the ability to bond strongly in wet and dry conditions to itself and almost any surface. Current synthesis methods fail to produce large quantities of polymer. High initial supply costs, harsh reaction conditions, and reactive reagents needed pose challenges to commercial scale production. There are unmet needs in the further development of nature inspired adhesives for industrial and medical uses.

SUMMARY OF INVENTION

The present disclosure relates to processes of large scale synthesis of monomers and the polymerization thereof for manufacturing catechol-containing polymers of industrial importance.

In some illustrative embodiments, several protected monomers and their synthesis have been exemplified. In some other embodiments, polymerization routes from each monomer are explored with their pros and cons for scale-up outlined. Yet in some other embodiments, deprotection strategies from each polymerization are disclosed together their relevant aspects for a large scale manufacturing.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIGS. 3A-3C show $^1$H NMR spectra of polymer produced from anionic polymerization. FIG. 1A: before deprotection; FIG. 3B: after BBr$_3$ deprotection; and FIG. 3C: after iodocyclohexane deprotection.

FIGS. 4A-4C depict $^1$H NMR spectrum of polymer synthesized by suspension polymerization. FIG. 4A: before deprotection; FIG. 4B: after BBr$_3$ deprotection; and FIG. 4C: after iodocyclohexane deprotection.

DETAILED DESCRIPTION

For the purposes of promoting an understanding of the principles of the present disclosure, reference will now be made to the embodiments illustrated in the drawings, and specific language will be used to describe the same. The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

As usd herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

As disclosed herein, a solution polymerization uses a compatible organic solvent to dissolve monomer and initiator into solution. A suspension polymerization uses water as the solvent for a heterogeneous mixture with monomer and a monomer-soluble initiator. A bulk polymerization uses no solvent, just the monomer and an initiator.

For a free radical polymerization, the process may be performed in one of those three ways, solution polymerization, suspension polymerization and bulk polymerization. The following initiators can be used for all three types of polymerization process: dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), and 2,2'-azobis(2-methyl butyronitrile). However, for a controlled/living radical polymerization process, polymerization can be initiated by: 2,2,6,6-Tetramethyl-1-piperidinyloxy (TEMPO) for nitroxide-mediated radical initiation, arenesulfonyl chlorides with a metal catalyst, alkyl halide with a transition metal catalyst for atom transfer radical addition polymerization (ATRP), reversible addition fragmentation chain transfer (RAFT) agents, and ultraviolet (UV) light initiated radicals. Nonetheless, for a controlled or living polymerizations with many of these initiators, traditional practice may find difficulties on a large scale preparation.

An anionic polymerization normally uses organolithium reagents such as n-butyllithium, sec-butyllithium, tert-butyllithium as an initiator to start the polymerization process, and the polymerization performed in a compatible solvent.

For a cationic polymerization, a Lewis acid, such as $AlCl_3$, $BF_3$, $SnCl_4$, $SbCl_5$, $ZnCl_2$, $TiCl_4$, and organometallic derivatives of these metal halides, may be used as the initiator to trigger the polymerization process. The polymerization process is performed in a compatible solvent or a mixture of solvents. As used herein, an organometallic derivatives of these metal halide Lewis acids is a derivative that substituting one or more of the halides with an organic functionalities, such as an alkyl, an alkenyl, a heteroalkyl, a heteroalkenyl, a cycloalkyl, a cycloalkeny, a heterocycloalkyl, or a heterocycloalkenyl. For example, $AlR_3$, $AlR_2Cl$, $BR_3$, $TiCl_3R$, etc. Activity and stereoselectivity of those inorganic Lewis acids and their organometallic derivatives can be manipulated by substituting some of the halides with —R groups.

In some illustrative embodiments, this disclosure relates to a process for manufacturing a catechol-containing copolymer comprising the steps of
a) preparing a protected 3,4-dihydroxystyrene;
b) mixing said protected 3,4-dihydroxystyrene with styrene to give a mixture;
c) adding water to said mixture of protected 3,4-dihydroxystyrene and styrene to give a suspension;
d) adding an initiator of polymerization to said suspension under a constant stirring to trigger said polymerization;
e) quenching said polymerization; and
f) removing protection from said protected 3,4-dihydroxystyrene to afford said catechol-containing copolymer.

In some illustrative embodiments, this disclosure relates to a process for manufacturing a catechol-containing copolymer as disclosed herein, wherein said initiator for a free radical polymerization is dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), 2,2'-azobis(2-methyl butyronitrile), or a combination of any two or more thereof.

In some illustrative embodiments, this disclosure relates to a process for manufacturing a catechol-containing copolymer as disclosed herein, wherein the speed of said constant stirring controls the molecular weight/size of said catechol-containing copolymer.

In some illustrative embodiments, this disclosure relates to a process for manufacturing a catechol-containing copolymer as disclosed herein, wherein the protection group of said protected 3,4-dihydroxystyrene is an acetonide.

In some illustrative embodiments, this disclosure relates to a process for manufacturing a catechol-containing copolymer as disclosed herein, wherein the protection group of said protected 3,4-dihydroxystyrene is a methoxy or silyl ether.

In some illustrative embodiments, this disclosure relates to a process for manufacturing a catechol-containing copolymer as disclosed herein, wherein removing the protection from said protected 3,4-dihydroxystyrene is carried out with $BBr_3$ in a compatible solvent.

In some illustrative embodiments, this disclosure relates to a process for manufacturing a catechol-containing copolymer as disclosed herein, wherein removing the protection from said protected 3,4-dihydroxystyrene is carried out with iodo-cyclohexane in a compatible solvent.

In some illustrative embodiments, this disclosure relates to a process for manufacturing a catechol-containing copolymer as disclosed herein, wherein the molar ratio of said protected 3,4-dihydroxystyrene to styrene of said mixture ranges from about 1:100 to 100:1.

In some other illustrative embodiments, this disclosure relates to a process for manufacturing a catechol-containing copolymer comprising the steps of
 a) preparing protected 3,4-dihydroxystyrene;
 b) mixing said protected 3,4-dihydroxystyrene with styrene to give a mixture;
 c) adding an initiator of polymerization to said mixture under a constant stirring to trigger said polymerization;
 d) quenching said polymerization; and
 e) removing protection from said protected 3,4-dihydroxystyrene to afford said catechol-containing copolymer.

In some other illustrative embodiments, this disclosure relates to a process for manufacturing a catechol-containing copolymer as disclosed herein, wherein said initiator of polymerization is an initiator for a free radical polymerization.

In some other illustrative embodiments, this disclosure relates to a process for manufacturing a catechol-containing copolymer as disclosed herein, wherein said initiator for a free radical polymerization comprises 2,2,6,6-tetramethyl-1-piperidinyloxy (TEMPO) for a nitroxide-mediated radical initiation, an arenesulfonyl chloride with a metal catalyst, an alkyl halide with a transition metal catalyst for atom transfer radical addition polymerization (ATRP), an reversible addition fragmentation chain transfer (RAFT) agent, or a ultraviolet (UV) light for initiating said free radical polymerization.

In some other illustrative embodiments, this disclosure relates to a process for manufacturing a catechol-containing copolymer as disclosed herein, wherein said initiator of polymerization is an initiator for an anionic polymerization.

In some other illustrative embodiments, this disclosure relates to a process for manufacturing a catechol-containing copolymer as disclosed herein, wherein said initiator for an anionic polymerization is an organo lithium reagent.

In some other illustrative embodiments, this disclosure relates to a process for manufacturing a catechol-containing copolymer as disclosed herein, wherein said organolithium reagent is n-butyllithium, sec-butyllithium, or tert-butyllithium.

In some other illustrative embodiments, this disclosure relates to a process for manufacturing a catechol-containing copolymer as disclosed herein, wherein said initiator of polymerization is an initiator for a cationic polymerization.

In some other illustrative embodiments, this disclosure relates to a process for manufacturing a catechol-containing copolymer as disclosed herein, wherein said initiator for a cationic polymerization is a Lewis acid, an organic or an inorganic one.

In some other illustrative embodiments, this disclosure relates to a process for manufacturing a catechol-containing copolymer as disclosed herein, wherein said Lewis acid comprises $AlCl_3$, $BF_3$, $SnCl_4$, $SbCl_5$, $ZnCl_2$, $TiCl_4$, or an organometallic derivative thereof.

In some other illustrative embodiments, this disclosure relates to a process for manufacturing a catechol-containing copolymer as disclosed herein, wherein the protection group of said protected 3,4-dihydroxystyrene is an acetonide.

In some other illustrative embodiments, this disclosure relates to a process for manufacturing a catechol-containing copolymer as disclosed herein, wherein the protection group of said protected 3,4-dihydroxystyrene is a methoxy or silyl ether.

In some other illustrative embodiments, this disclosure relates to a process for manufacturing a catechol-containing copolymer as disclosed herein, wherein removing the protection from said protected 3,4-dihydroxystyrene is carried out with $BBr_3$ in a compatible solvent.

In some other illustrative embodiments, this disclosure relates to a process for manufacturing a catechol-containing copolymer as disclosed herein, wherein removing the protection from said protected 3,4-dihydroxystyrene is carried out with iodo-cyclohexane in a compatible solvent.

In some other illustrative embodiments, this disclosure relates to a process for manufacturing a catechol-containing copolymer as disclosed herein, wherein the molar ratio of said protected 3,4-dihydroxystyrene to styrene of said mixture ranges from about 1:100 to 100:1.

In some other illustrative embodiments, this disclosure relates to a catechol-containing copolymer manufactured according to the process disclosed herein.

In some other illustrative embodiments, this disclosure relates to a catechol-containing copolymer manufactured according to the process of
 a) preparing protected 3,4-dihydroxystyrene;
 b) mixing said protected 3,4-dihydroxystyrene with styrene to give a mixture;
 c) adding water to said mixture of protected 3,4-dihydroxystyrene and styrene to give a suspension;
 d) adding an initiator of polymerization to said suspension under a constant stirring to trigger said polymerization;
 e) quenching said polymerization; and
 f) removing protection from said protected 3,4-dihydroxystyrene to afford said catechol-containing copolymer.

In some illustrative embodiments, this disclosure relates to a catechol-containing copolymer manufactured according to the process as disclosed herein, wherein said initiator of polymerization is an initiator for a free radical polymerization.

In some illustrative embodiments, this disclosure relates to a catechol-containing copolymer manufactured according to the process as disclosed herein, wherein said initiator for a free radical polymerization comprises dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), 2,2'-azobis(2-methyl butyronitrile), or a combination of any two or more thereof.

In some illustrative embodiments, this disclosure relates to a catechol-containing copolymer manufactured according to the process as disclosed herein, wherein the speed of said constant stirring controls the molecular weight/size of said catechol-containing copolymer.

In some illustrative embodiments, this disclosure relates to a catechol-containing copolymer manufactured according to the process as disclosed herein, wherein the protection group of said protected 3,4-dihydroxystyrene is an acetonide, methoxy, or silyl ether.

In some illustrative embodiments, this disclosure relates to a catechol-containing copolymer manufactured according to the process as disclosed herein, wherein removing of protection from said protected 3,4-dihydroxystyrene is carried out with $BBr_3$ or iodo-cyclohexane in a compatible solvent.

In some illustrative embodiments, this disclosure relates to a catechol-containing copolymer manufactured according to the process as disclosed herein, wherein the molar ratio of said protected 3,4-dihydroxystyrene to styrene of said mixture ranges from about 1:100 to 100:1.

Yet in some other illustrative embodiments, this disclosure relates to a catechol-containing copolymer manufactured according to the steps of
a) preparing protected 3,4-dihydroxystyrene;
b) mixing said protected 3,4-dihydroxystyrene with styrene to give a mixture;
c) adding an initiator of polymerization to said mixture under a constant stirring to trigger said polymerization;
d) quenching said polymerization; and
e) removing protection from said protected 3,4-dihydroxystyrene to afford said catechol-containing copolymer.

Yet in some other illustrative embodiments, this disclosure relates to a catechol-containing copolymer manufactured according to the steps disclosed herein, wherein said initiator of polymerization is an initiator for an anionic polymerization.

Yet in some other illustrative embodiments, this disclosure relates to a catechol-containing copolymer manufactured according to the steps disclosed herein, wherein said initiator for an anionic polymerization is an organo lithium reagent selected from the group consisting of organolithium reagent is n-butyllithium, sec-butyllithium, and tert-butyllithium.

Yet in some other illustrative embodiments, this disclosure relates to a catechol-containing copolymer manufactured according to the steps disclosed herein, wherein said initiator of polymerization is an initiator for a cationic polymerization.

Yet in some other illustrative embodiments, this disclosure relates to a catechol-containing copolymer manufactured according to the steps disclosed herein, wherein said initiator for a cationic polymerization is a Lewis acid, an organic or an inorganic one.

Yet in some other illustrative embodiments, this disclosure relates to a catechol-containing copolymer manufactured according to the steps disclosed herein, wherein said Lewis acid is selected from the group consisting of $AlCl_3$, $BF_3$, $SnCl_4$, $SbCl_5$, $ZnCl_2$, $TiCl_4$, and an organometallic derivative thereof.

Yet in some other illustrative embodiments, this disclosure relates to a catechol-containing copolymer manufactured according to the steps disclosed herein, wherein the protection group of said protected 3,4-dihydroxystyrene is an acetonide, methoxy or silyl ether.

Yet in some other illustrative embodiments, this disclosure relates to a catechol-containing copolymer manufactured according to the steps disclosed herein, wherein said removing of protection from said protected 3,4-dihydroxystyrene is carried out with $BBr_3$ or iodo-cyclohexane in a compatible solvent.

Yet in some other illustrative embodiments, this disclosure relates to a catechol-containing copolymer manufactured according to the steps disclosed herein, wherein said initiator of polymerization is an initiator for a free radical polymerization.

Yet in some other illustrative embodiments, this disclosure relates to a catechol-containing copolymer manufactured according to the steps disclosed herein, wherein said initiator for a free radical polymerization comprises 2,2,6,6-Tetramethyl-1-piperidinyloxy (TEMPO) for nitroxide-mediated radical initiation, an arenesulfonyl chloride with a metal catalyst, an alkyl halide with a transition metal catalyst for atom transfer radical addition polymerization (ATRP), a reversible addition fragmentation chain transfer (RAFT) agent, or an ultraviolet (UV) light for initiating said free radical polymerization.

Yet in some other illustrative embodiments, this disclosure relates to a catechol-containing copolymer manufactured according to the steps disclosed herein, wherein the molar ratio of said protected 3,4-dihydroxystyrene to styrene of said mixture ranges from about 1:100 to 100:1.

The followings are some non-limiting examples to illustrate the concepts and the practical uses of this disclosure.

Introduction. Poly[styrene-co-(3,4-dihydroxystyrene)], or poly(catechol-styrene), has the unique ability to bond strongly in wet and dry conditions to itself and almost any surface. The incorporation of catechol containing monomers into a styrene backbone provides this reactivity and functionality.[1] It is easily synthesized on a lab scale for testing and evaluation, but several factors hinder its production on the commercial scale. The limited supply of the starting materials drives up the total cost from the start, and harsh reagents used in the process pose concerns for scaling up production. Herein, methods for monomer synthesis, polymer synthesis, and polymer deprotection are presented to address the factors preventing large scale production.

Due to the reactive nature of catechol containing compounds and their ability to oxidize and crosslink together,[23] it is necessary to add protecting groups to the monomer to facilitate polymerization. These protecting groups must be bound tight enough to be stable during polymerization but selectively removed relatively easily in the final step without the need for harsh reagents that could tear the backbone apart. Scheme 1 shows the two steps currently required to synthesize poly(catechol-styrene), with polymerization of a protected catechol containing monomer and subsequent deprotection step to yield free catechols. In this work, several potential routes to viable starting materials are presented to mitigate the high initial costs and scale-up issues preventing this product from entering the market.

Scheme 1: Polymerization and deprotection steps in the current synthetic pathway to produce poly(catechol-styrene). Cost and availability of the protected catechol containing monomer have encouraged an initial prior step to get to the starting material.

The polymerization of protected catechol containing monomer and styrene can be done through cationic, anionic, or radical polymerization (including, but not limited to metal catalyzed,[4] ATRP, RAFT,[5] nitroxide mediated,[6] UV/light initiated mechanisms in solution, bulk, emulsion, or suspension polymerization methods). Anionic polymerization has been used for lab synthesis, but the need for very low reaction temperatures (−78° C.) and harsh reagents (organolithium reagents such as n-butyllithium, sec-butyllithium, tert-butyllithium) can be difficult to scale to commercial production. Radical polymerization is possible in a miscible solvent but with limited reproducibility in catechol incorporation and molecular weights. Radical initiated polymerization is effective in a suspension polymerization scheme.

Suspension polymerization has been used for the synthesis of polystyrene on a commercial scale. In addition to the large amount of product that can be produced, suspension polymerization has several benefits for commercial production including water as the primary solvent, control over polymer molecular weight, and ease of polymer cleanup. A surfactant (polyvinyl alcohol, methyl hydroxy propyl cellulose, methyl cellulose, polyoxyethylene, polyoxypropylene) and radical initiator (azobisisobutyronitrile, benzoyl peroxide) are combined into water with the monomers.[7] Vigorous mechanical stirring and heat then generates the desired polymer at lengths proportional to the stirring speed.[8] Because the monomers are kept within a micelle throughout the reaction, suspension polymerization results in high conversion, thus high yield and less residual monomer.

Results and Discussion
Monomer
3,4-Dimethoxystyrene

Free phenol groups in catechols can inhibit polymerization reactions. The catechol functionality requires adding protecting groups prior to polymerization. The catechol groups must then be deprotected for the resulting polymer to have adhesive functionality. An easy way to synthesize poly(catechol-styrene) is to begin with 3,4-dimethoxystyrene. This monomer offers methoxy protecting groups that can be deprotected after polymer synthesis. While methoxy groups can undergo H-abstraction in polymerization reactions,[9] the resulting increase in molecular weight distribution can have a positive effect on adhesion by providing both shorter polymer chains for surface interactions and longer chains for crosslinking and bulk cohesion.[10]

The 3,4-dimethoxystyrene monomer is found naturally in coffee and can be purchased commercially.[11-13] However, it is only available in small quantities and is expensive. This high initial cost decreases the commercial viability of poly (catechol-styrene), leaving the adhesive orders of magnitude more expensive than market competitors. Accessibility also yields an issue since it is only available in 10 g quantities. The polymer has achieved optimal adhesion in certain conditions with a composition of about 33% 3,4-dihydroxystyrene. This large incorporation of the monomer makes availability and cost a significant issue in commercialization efforts, leading to the exploration of other synthetic methods to decrease cost and improve scalability.

Based on the cost of starting materials and reagents, the cheapest way to synthesize 3,4-dimethoxystyrene is through a Wittig reaction with veratraldehyde (3,4-dimethoxybenzaldehyde) (Scheme 2). This reaction is the current synthetic method implemented commercially to produce the monomer, based on characterization by NMR and the presence of aldehyde impurities in the purchased product. However, this method is not feasible on a large scale because of harsh conditions required from using n-butyllithium (n-BuLi), thus explaining why the product is expensive and only available in small quantities. Although the laboratory-scale synthesis can result in an experimental yield of >80%, separating the aldehyde starting material from the vinyl product is difficult.

Scheme 2: Wittig reaction of veratraldehyde to yield 3,4-dimethoxystyrene

Veratraldehyde

The next cheapest potential starting material to synthesize the monomer is vanillin, or 4-hydroxy-3-methoxybenzaldehyde. This derivative also requires the Wittig reaction after an additional methylation step to protect the phenol group. Consequently, this method would also not be viable on a large scale. A similar derivative, 2-methoxy-4-vinylphenol (MVP), contains one methoxy and one phenol group as well, but already has vinyl functionality in place of the aldehyde. Although this starting material is more expensive than vanillin or veratraldehyde, it is still much cheaper than purchasing 3,4-dimethoxystyrene and is also commercially available on a kilogram scale.

The MVP derivative requires adding a protecting group to the phenol before it is polymerizable. A methylation using a Williamson ether synthesis is one potential way of converting the MVP to the monomer. This reaction can be performed with multiple methylating agents, all of which pose toxicity concerns. Dimethylsulfate is commonly used for industrial scale methylation reactions. This process would be a viable option as the first step for large-scale methylation of the vanillin starting material, but the high temperatures required are not ideal for the olefin-containing MVP. A less toxic methylating agent that can also be used in this reaction is dimethylcarbonate, providing a green reagent on an industrial scale that is biodegradable and an Environmental Protection Agency (EPA) exempt volatile organic compound (VOC). However, the lower toxicity comes with lower reactivity, requiring higher temperatures and/or a catalyst to be effective.[14]

Scheme 3: Methylation of MVP to make 3,4-dimethoxystyrene.

On a laboratory-scale, iodomethane is an ideal methylating agent to produce the monomer from MVP. This reaction, shown in Scheme 3, can yield a purer product than the Wittig reaction of the aldehyde (Scheme 2) by performing a base extraction using 2% NaOH to oxidize the phenol to improve separation. The reaction is also performed at a lower temperature that is more compatible with the olefin in the MVP. However, iodomethane is generally the least efficient reagent for methylating phenols, resulting in a low yield from about 40-60% conversion. Although this reaction does reduce the cost of materials for the polymer by almost half, the low yield combined with the relatively high cost of iodomethane makes this method much more expensive than starting with veratraldehyde. Additionally, performing this reaction on an industrial scale is not ideal due to toxicity and the use of a halogenated compound.

Scheme 4: Synthesis of 3,4-dimethoxystyrene monomer by reduction of an acetophenone derivative.

A common route to produce styrene is through acetophenone reduction. An acetophenone derivative of the 3,4-dimethoxy starting material, acetoveratrone (3',4'-dimethoxyacetophenone), is commercially available. Although the acetophenone derivative is available in smaller quantities, it is cheaper than MVP. The cost to produce the monomer through this reaction can bring the total cost of the resulting polymer to ~10% of the initial cost. Scheme 4 shows sodium borohydride as the reducing agent to produce the 3,4-dimethoxystyrene from acetoveratrone. Sodium borohydride is the most commonly used reducing agent industrially, but there are many others available to perform the reaction. Therefore, this synthetic method can reduce the price of the overall product and improve the scale-up and accessibility of the monomer.

Other protecting groups. Methoxy protecting groups are stable through polymerization reactions but require harsh conditions to remove. Consequently, other means of protecting the catechol has been explored. Acetonide protecting groups have been shown to lower the molecular weight distribution and offer an easier deprotection of the polymer. However, the acetonide must be added directly to 4-methylcatechol. This results in three subsequent steps to synthesize the monomer (Scheme 5), leading to higher material costs of nearly 5× that of the Wittig reaction of veratraldehyde. Additionally, while acetonide protecting groups can produce cleaner polymerization reactions with lower dispersity,[9] polymer adhesives tend to benefit from larger dispersities and higher molecular weights.[15]

Scheme 5: Synthesis of acetonide protected monomer, adapted from Leibig et. al. Macromol. 2016, 49 (13), 4794.

Another protecting group that has been pursued is silyl ethers, which can typically be removed easily with acidic conditions. Unlike acetonide protecting groups, silyl ethers can be used to protect 3,4-dihydroxybenzaldehyde.[16] This method requires only two steps to achieve the monomer, but the price of 3,4-dihydroxybenzaldehyde along with the additional Wittig reaction step makes this process also unfavorable for scale-up. As an alternative to reduce cost and increase scalability, triethyl silane was used with a tris(pentafluorophenyl)borane catalyst to protect the free phenol group in MVP. However, the silyl group would reduce the olefin as well. This method was also attempted with a similar guaiacol derivative, eugenol (2-Methoxy-4-(prop-2-en-1-yl)phenol), that incorporates an extra carbon between the aromatic ring and the olefin, but the silane still reacted with the double bond.

Polymerization Reaction

Anionic polymerization is currently used to polymerize styrene and 3,4-dimethoxystyrene together in a random copolymer up to 15 grams. Experience with the synthesis method has resulted in predictable molecular weights and incorporation of protected catechol. Larger batch sizes present several practical issues. The highly reactive nature of n-BuLi presents some safety concerns when increasing the batch size. The reaction must be kept chilled to prevent the reaction from running too quick and terminating before full conversion. At larger batch sizes, maintaining a large enough thermal sink has become difficult. Additional difficulties arise when cleaning the synthesized polymer after the reaction. Large volumes of solvents are needed and become difficult to handle and remove as batch size increases. Because of the highly reactive nature of the initiator, low reaction temperatures, and large volume of solvents needed, anionic polymerization is not ideal for large scale production.

Free radical polymerization tends to be more feasible on a commercial scale and has been implemented industrially for decades.[17] As such, laboratory-scale solution polymerization methods were performed to synthesize poly(catechol-styrene) using different solvents (e.g. toluene, dimethylformamide, tetrahydrofuran) and with different initiators (e.g. AIBN, BPO, TEMPO). Each variation resulted in a low yield averaging about 50%. Considering the high initial cost of the monomer, this loss in efficiency was not practical.

Poly(3,4-dimethoxystyrene-co-styrene) was produced through suspension polymerization in varying quantities (up to 22 grams to date), catechol incorporations, and molecular weight. The average molecular weight of the resulting polymer was changed by increasing or decreasing the stirring speed in the reaction. Lower stirring speeds will increase the suspended droplet size and increase the resulting polymer chain length. Increasing the speed of stirring will decrease the suspended droplet size and decrease the resulting polymer chain length.[7] By adjusting the stirring speed while the reaction is occurring could increase the dispersity of the resulting polymer. Using a suspension polymerization provides several advantages at large scale. The primary advantage is the use of water as the primary solvent and mechanical filtration to separate the polymer from solvent after polymerization. Heating and maintaining the mild reaction temperature is easier done on a large scale compared to the chilled condition of anionic polymerization. While the reaction was done in degassed water and under an argon atmosphere, literature suggests this method is also more tolerant to oxygen ingress compared to anionic polymerization.[18]

Deprotection

The reactivity and crosslinking ability of catechol require protecting groups be added to the monomer for polymerization. Efforts to date have used $BBr_3$ for deprotection to expose catechol groups.[1,3] High conversion of protected catechol groups to free catechol can be achieved with $BBr_3$, however careful control over the reaction is required. The reactivity of $BBr_3$ necessitate the cooling of the reaction and air and water free reaction vessels. Prolonged storage of $BBr_3$, even under an inert atmosphere, results in decreased effectiveness and incomplete deprotection of the polymer. Emulsifications have occurred during the precipitation step resulting in difficult polymer recovery and low yield. Incomplete removal of all the boron can cause the bis-catechol borate to persist. Repeated acid washes are required to remove the remaining boron.

Scheme 6: Reaction of iodocyclohexane in situ for deprotection of poly(catechol-styrene).

Iodocyclochexane in dimethylformamide (DMF) was reported to be effective at arylmethoxy to phenol conversions of small molecules.[19,20] In DMF at elevated temperatures, iodocyclohexane reacts to form cyclohexene and hydrogen iodide (Scheme 6). The hydrogen iodide is responsible for the deprotection without reacting with the polymer backbone (Scheme 7). This method is more tolerant to water and air while maintaining high conversion of protected catechol groups to catechols. Residual iodide can persist, likely bound to the electron rich phenolic groups of the polymer, leaving a yellow color to the polymer. Water washes can be used to remove remaining iodine but may not be necessary. A potential downside to this deprotection approach may be the iodomethane byproduct. Although the iodomethane can be recycled for the methylation of MVP to generate the 3,4-dimethoxystyrene monomer.

Scheme 7: Deprotection of catechol within the polymer backbone from HI produced from iodocyclohexane.

Cost Analysis and Overall Synthetic Method

A cost analysis was performed for the synthesis of the poly(catechol-styrene) to determine the best methods to pursue for scale-up efforts. The original synthetic method includes two steps: the polymerization and the deprotection. Using this approach with 3,4-dimethoxystyrene as the monomer, the materials cost is an estimated ~$22 per gram of polymer. This cost is based upon a target composition of 33% catechol and using the established anionic polymerization with $BBr_3$ deprotection. The cost of materials would have to be reduced to at least ~10% in order to compete with the pricing of market competitors. Given the high cost of 3,4-dimethoxystyrene monomer, the cheapest routes to obtain a polymerizable catechol-containing monomer were explored.

Figure 1:
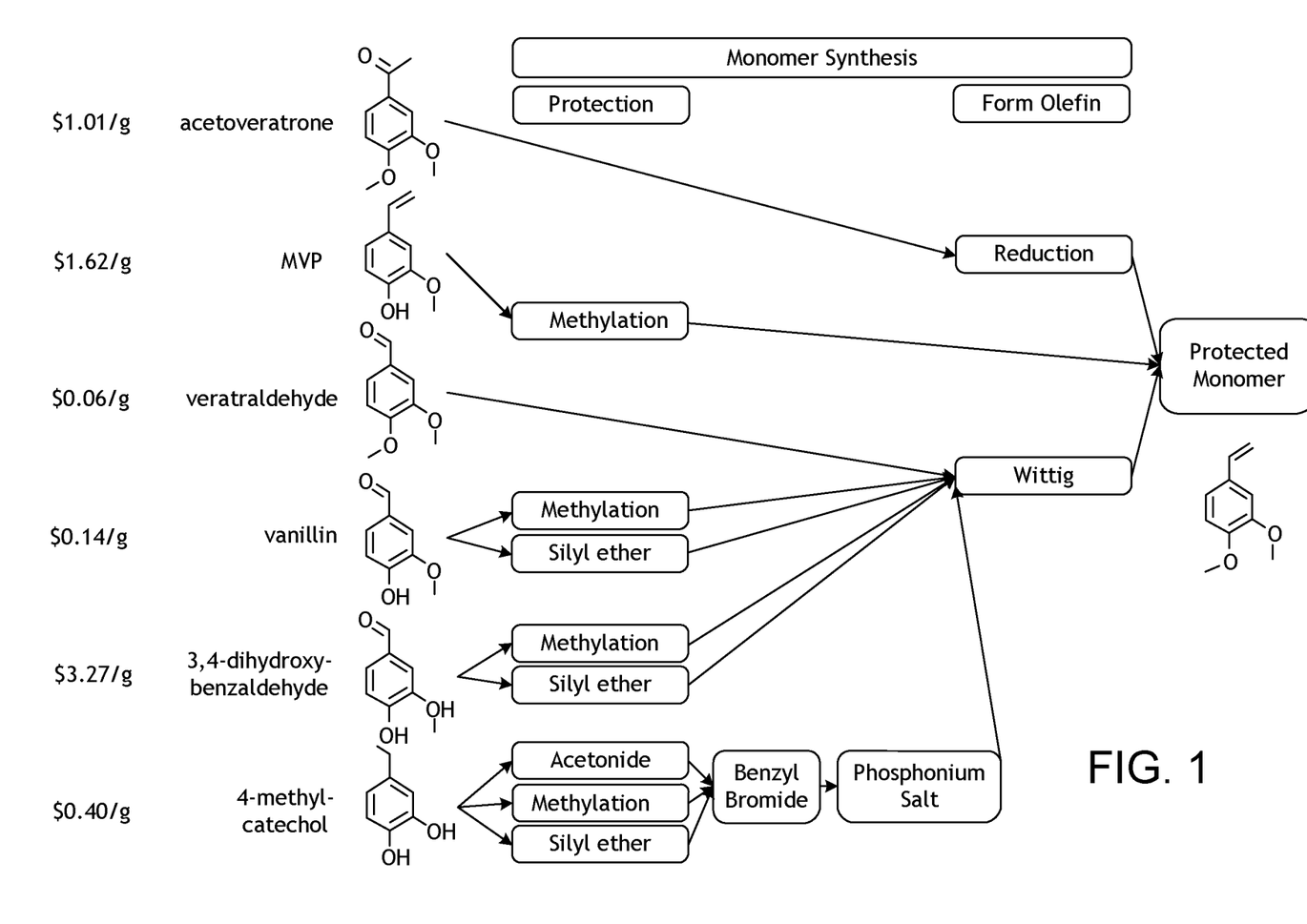
FIG. 1 shows potential pathways to synthesize a viable protected catechol containing monomer. 3,4-Dimethoxystyrene is pictured with a relative purchase price of ~$22 per gram.

Potential starting materials to produce a protected monomer are shown in FIG. 1. Relative prices are included for reference and were all obtained from the lowest price and highest availability from MilliporeSigma. Although other vendors are available for each, one vendor was chosen for consistency as a price comparison relative to each other. Lower costs and higher availability can be offered by different vendors at the commercial level, potentially reducing costs further for each potential route.

Acetoveratrone, MVP, and veratraldehyde each only require one step to achieve a viable monomer for polymerization (FIG. 1). Each synthesis step increases the cost of the monomer, so these three are preferred over other starting materials for initial commercialization methods. Veratraldehyde is the least expensive and is therefore the current starting material in commercially available 3,4-dimethoxystyrene. Laboratory-scale materials costs of this synthesis are less than $1/g, and the resulting purchase price is $22/g. This process requires a Wittig reaction and is therefore likely not the best option for scale-up.

The cost of materials for laboratory-scale methylation of MVP using iodomethane is 40% lower than the monomer purchase price. This method presents a good alternative to reducing the overall cost. Although iodomethane may not be the best methylating agent to use for scale-up, other industrial processes (e.g. dimethylsulfate, dimethylcarbonate) can further reduce the price. Another consideration to decrease cost and improve efficiency is a subsequent iodocyclohexane deprotection for recycling of iodomethane for methylation. Both methods must be performed together in the same facility but removing the initial cost of iodomethane and mitigating waste from the deprotection would help reduce overall cost of this production pathway and introduce a more sustainable method.

A reduction of the acetoveratrone currently offers the lowest cost with the highest potential for scale-up with the given starting materials and methods. The cost of materials is <10% the purchase price of the monomer. While cost is still about twice that of the veratraldehyde pathway, the process can be produced at scale with the limit of the acetoveratrone availability.

Figure 2:
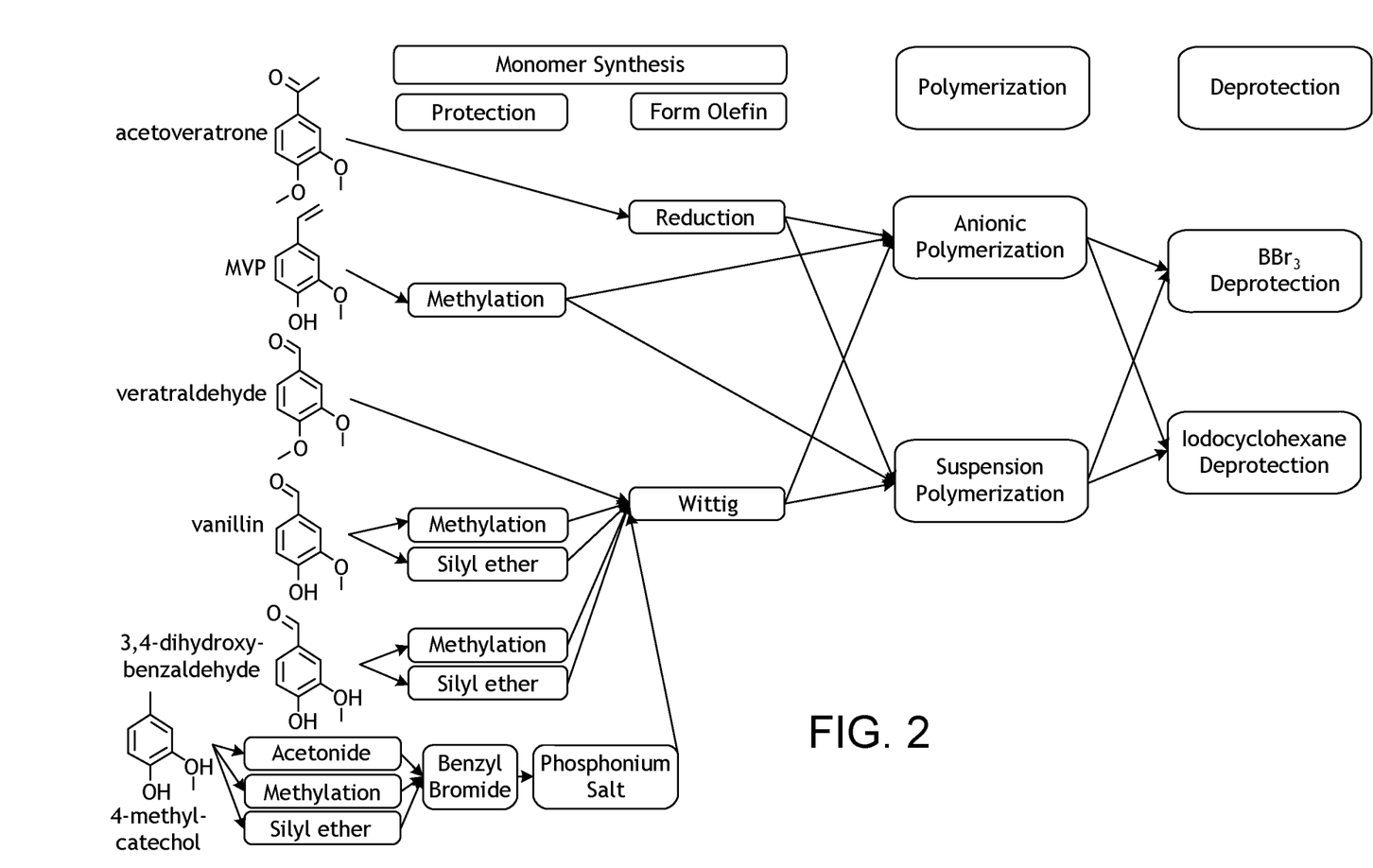
FIG. 2 depicts synthetic pathways to achieve production of poly(catechol-styrene) from different starting materials.

After the monomer is produced, different polymer synthesis and deprotection methods can be employed. FIG. 2 shows the variations of pathways to achieve the polymer, each associated with different costs. While cost of materials does not differ significantly for polymerization methods, reaction conditions at a commercial scale may affect the total cost of the polymer. Anionic polymerization is used in commercial production of some polymers but usually only when required. Suspension polymerization on a manufacturing scale is more common and offers safer conditions. Overall, suspension polymerization will likely be a better option than anionic for a large scale production.

Deprotection of the polymer also contributes to the total price. Iodocyclohexane deprotection may be slightly more expensive, but the cost increase is relatively insignificant compared to the monomer cost. Additionally, production at scale would be cheaper in labor costs given the shorter reaction times. Deprotection with $BBr_3$ requires more harsh conditions that are less favorable on a commercial scale but has exhibited higher adhesive strengths in certain conditions.

Conclusion. Several possible protected monomers and their synthesis have been proposed. The relevant considerations for commercial scale production have also been outlined. Polymerization routes from each monomer has been explored with their pros and cons for scale-up outlined. Deprotection strategies from each polymerization are described and their relevant aspects for a large scale synthesis.

Certain embodiments of the present disclosure may be better understood through the following non-limiting examples.

Methods

Monomer

All starting materials and reagents were purchased from MilliporeSigma. Structure and purity of the products was confirmed using proton nuclear magnetic resonance ($^1$H NMR).

Wittig Reaction

Anhydrous tetrahydrofuran (THF) (16.0 mL) and 1.4 g of methyltriphosphonium bromide was added to a flask and purged with argon. A 1.5 mL aliquot of n-butyllithium (2.6 M in hexane) was added, turning the white suspension to an orange color. The solution was stirred for 4 hours before adding a solution of 3,4-dimethoxybenzaldehyde (1.4 g) dissolved in 10 mL of anhydrous THF. The reaction mixture was heated to 45° C. overnight. The solution was then diluted with THF (25 mL) and added to a separatory funnel with 50 mL of deionized water for extraction (4×25 mL) with methylene chloride. The solution was dried, and the solvents were removed in vacuo. Column chromatography was used to purify the 3,4-dimethoxystyrene product.

Methylation

Potassium carbonate (42 g) was added to a flask with 300 mL of acetone, followed by 40 mL of iodomethane and 8.3 mL of 2-methoxy-4-vinylphenol (MVP). After reflux under argon at 55° C. overnight, the solution was filtered and concentrated using a rotary evaporator. The product was then dissolved in methylene chloride and extracted three times with a 2% NaOH solution to remove any unreacted phenol-containing species. The methylene chloride layer was dried with magnesium sulfate before removing the solvent via rotary evaporation.

Reduction of Acetophenone

Anhydrous methanol (20 mL) was added to a flask to dissolve 1.76 g of 3,4-dimethoxyacetophenone. The solution was cooled to 0° C. before adding 0.88 g of sodium borohydride to the flask slowly. The reaction mixture was stirred in an ice bath for 4 hours. An $H_2SO_4$ solution was added dropwise to the flask to lower the pH to ~3 before refluxing. The mixture was poured into deionized water to remove excess borate salt. The aqueous solution was extracted three times with methylene chloride. The organic layer was dried with magnesium sulfate and concentrated in vacuo to yield the 3,4-dimethoxystyrene product.

Silylation

Acetonitrile (160 mL) and tert-butyldimethylsilyl chloride (32.1 g) were stirred under argon and 9.7 g of 3,4-dihydroxybenzaldehyde was added. The solution was cooled to 0° C. before slowly adding 1,8-diazabicyclo[5.4.0]-undec-7-ene (DBU) dropwise over 10 minutes. The mixture was stirred for 20 hours at 0° C. and concentrated to produce a yellow oil which was purified via column chromatography.

Polymerization

Radical Polymerization

Styrene (1 mL) and 3,4-dimethoxystyrene (0.9 mL) monomers were added to 10 mL of dimethylformamide (DMF) in a flame-dried schlenk flask under argon. Azobisisobutyronitrile (AIBN) was dissolved in 3.8 mL of DMF and added to the flask. The solution was stirred at 70° C. for 2 days and then quenched with 1 mL of methanol. Chloroform was added to dilute the solution, which was then poured into cold methanol giving a white precipitate. The liquid was decanted and removed by rotary evaporation. The residue was dissolved with chloroform and precipitated with methanol two more times before drying the product in vacuo.

Anionic Polymerization

In a flame dried schlenk flask, styrene and protected catechol monomer was added at the desired molar ratio to degassed toluene. The solution was chilled to −78° C. in a dry ice/isopropanol bath for 15 minutes, then n-butyllithium (2.6 M in hexane) was added dropwise. The reaction was held at −78° C. for 8 hours, then allowed to warm to room temperature. After 20 hours, the reaction was quenched with methanol. The polymer was precipitated out in ice cold methanol, which was then decanted, and the residue was dried.

The polymer was dissolved in chloroform, precipitated with methanol, and dried two additional times before drying under vacuum.

Suspension Polymerization

Polyvinyl alcohol (PVA) was dissolved in degassed water at 1 weight percent by heating to 90° C. The solution was cooled before calcium phosphate tribasic was added at 0.1 weight percent. Styrene and catechol containing monomers were added at the desired feed ratio. The initiator, benzoylperoxide (BPO), was added at 0.3 weight percent and a mechanical stirrer affixed to the reaction vessel. The reaction was performed at 90° C., 800 rpm, and under argon until high conversion was achieved. A small amount of methanol was added to quench the reaction and polymer product was filtered from the aqueous solutions. The polymer was redissolved in methylene chloride and precipitated out with methanol.

Deprotection $BBr_3$— In a flame dried flask, 1 g of dried polymer was dissolved in 20 mL methylene chloride and degassed. The solution was chilled to 0° C. before $BBr_3$ was added dropwise at 3 mole equivalence relative to the protected catechol incorporation of the polymer. The reaction was run overnight and allowed to come to room temperature. Methanol was added dropwise to quench the reaction. The polymer was precipitated out with 1% HCl and washed several times with 1% HCl.

Iodocyclohexane—Dried polymer was dissolved in DMF at 1 g polymer in 5 mL solvent. Iodocyclohexane was added at 10 mol equivalence relative to protected catechol incorporation. The reaction was heated to 145° C. and refluxed for 4 hours. The reaction was allowed to cool to room temperature and the polymer was precipitated out with water. The polymer was washed several times with methanol and water, then dried.

We have discovered that using iodocyclohexane for polymer deprotection is highly effective and we have been optimizing it for polymer deprotection. By NMR, the resulting deprotected polymer looks the same. The small peaks at 4.37 ppm and 3 ppm is iodine, iodocyclohexane and iodate, trapped in the polymer. Initial adhesion tests with minimal cleaning to remove the iodate and rigorously cleaned polymer show little difference in adhesive strength (4.9±0.9 MPa vs 3.3±0.6 MPa respectively). Considering time and more ideal conditions, the iodocyclohexane deprotection is an effective process for scale-up.

Controlling the speed of stirring will impact the suspended droplet size and result in control over the molecular weight and dispersity of the polymer product. There is a parabolic relationship between stirring speed and droplet size with a minimum droplet size occurring at about 500 rpm. The polymerization discussed have been carried out above 500 rpm thus decreasing the stir speed should decrease the droplet size and increase the molecular weight.

ISLH164 was the first full scale test of the suspension polymerization. Due to a mechanical failure, the stirring stopped during the reaction. The polymer beads then conglomerated and any unreacted olefins were then able to react with new chains and increase the molecular weight and dispersity. ISLH166 was a time study, and samples were taken throughout the polymerization. ISLH167 had identical conditions as ISLH164. The rpm was reduced for ISLH169, resulting in a drop in molecular weight that is consistent with literature. A broad dispersion of long and short copolymer is not a detriment to the adhesive quality of the resulting polymer. Long polymer chains help with chain entanglement and are crucial to the bulk strength of the cured adhesive and short polymer chains help with surface spreading and initial adhesion.[15]

TABLE 1

Characterization data from polymers synthesized via suspension polymerization

| No. | Polymer Ser. | RPM | Catechol % | Mw | Mn | PDI |
|---|---|---|---|---|---|---|
| 1 |  | 401 | 26 | 39,900 | 13,544 | 2.95 |
| 2 |  | 505 | 32 | 494,365 | 13,825 | 3.58 |
| 3 |  | 605 | 19 | 57,505 | 15,505 | 3.69 |
| 4 | ISLH169 | 690 | 24 | 15,871 | 7,780 | 2.04 |
| 5 |  | 699 | 19 | 64,862 | 17,407 | 3.73 |
| 6 |  | 795 | 26 | 53,234 | 12,679 | 4.2 |
| 7 | ISLH164 | 800 | 18 | 67,578 | 11,184 | 6.04 |
| 8 | ISLH166 | 802 | 22 | 21,256 | 8,443 | 2.52 |
| 9 | ISLH167 | 806 | 22 | 48,452 | 11,427 | 4.24 |

Figure 3A:
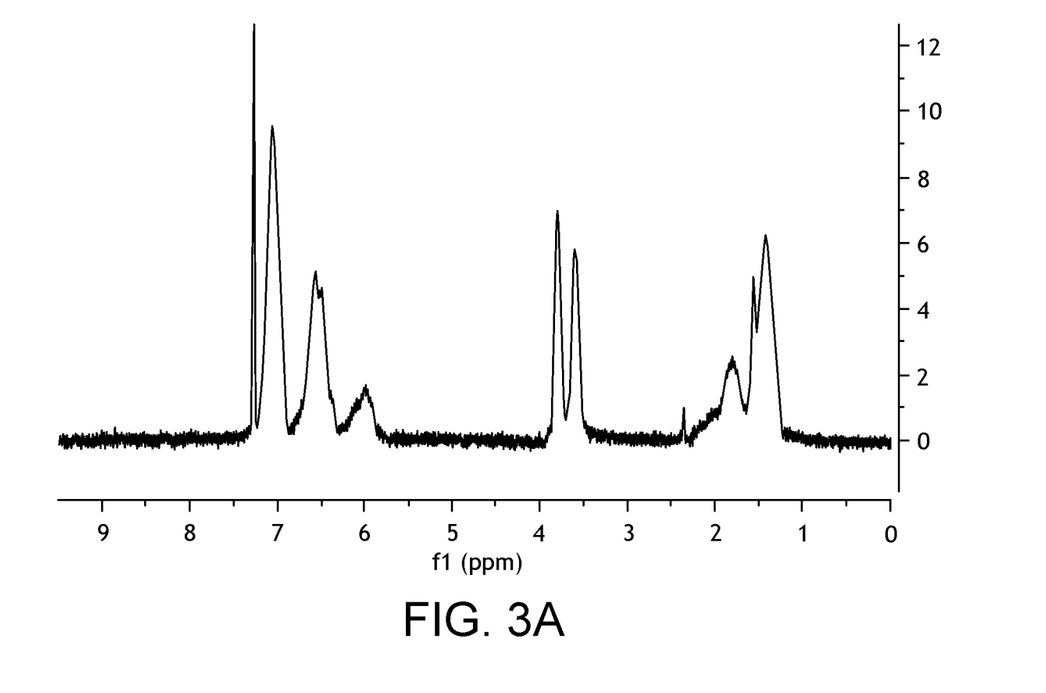
Figure 3B:
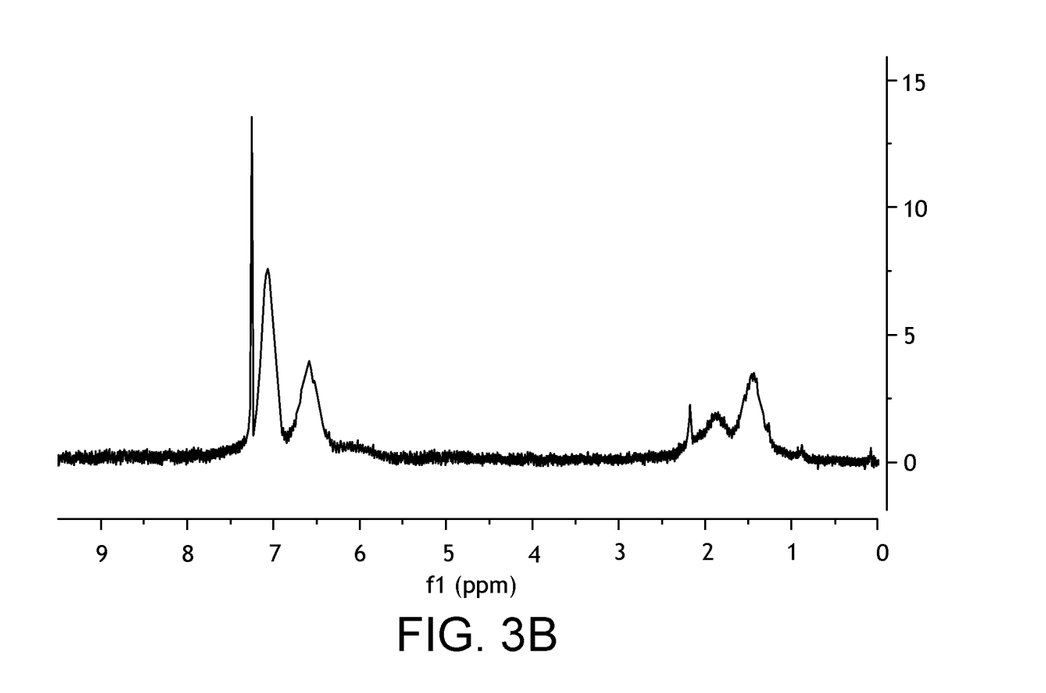
Figure 3C:
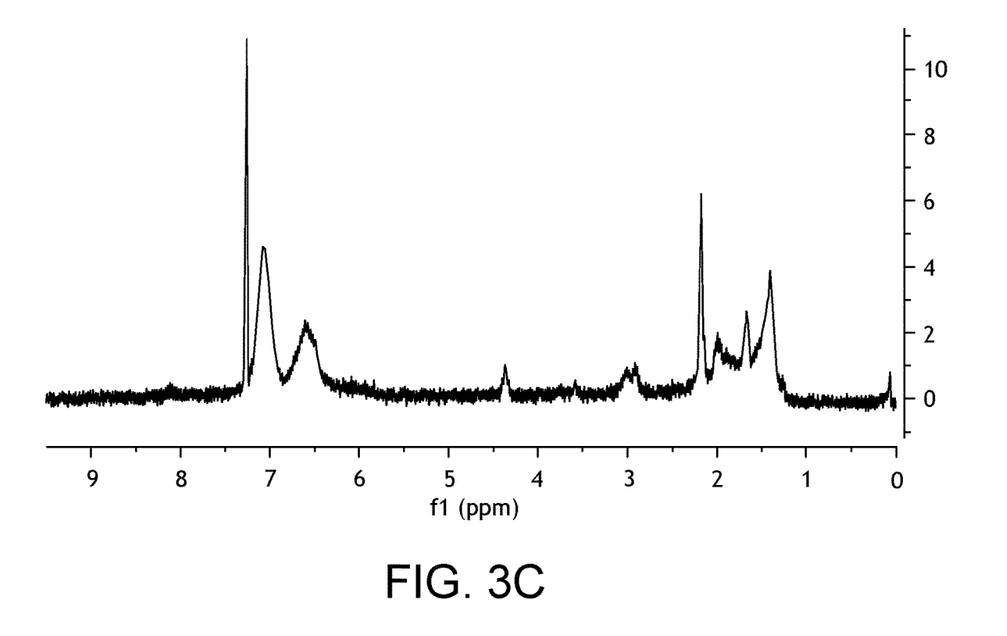

Initial molecular weight data from the suspension polymerization is in Table 1. Molecular weights were obtained using gel permeation chromatography (GPC). NMR spectra of protected and deprotected polymer are shown below (FIG. 3). The polymer was synthesized using anionic polymerization. The methoxy protecting group peaks are at 3.8 and 3.6 ppm, and deprotection of the polymer is confirmed with absence of these peaks after the deprotection step.

Figure 4A:
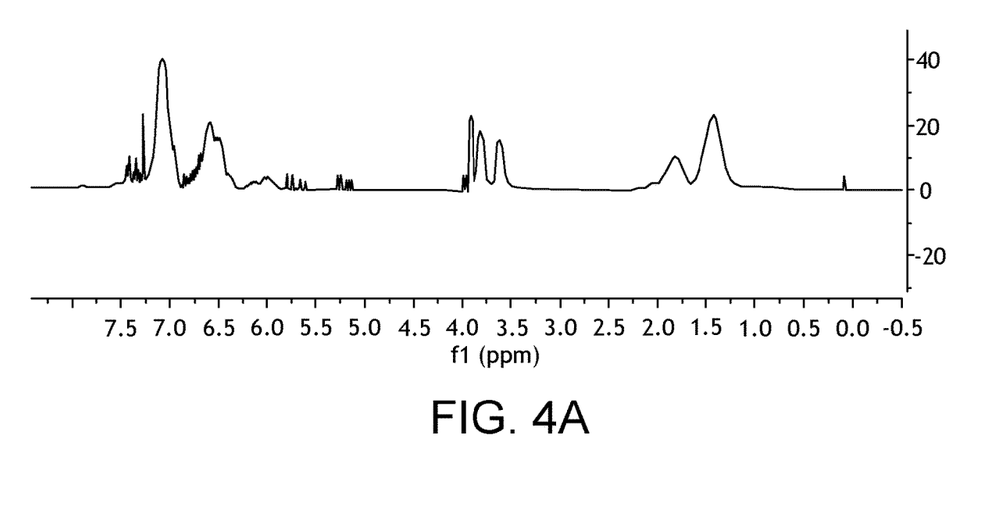
Figure 4B:
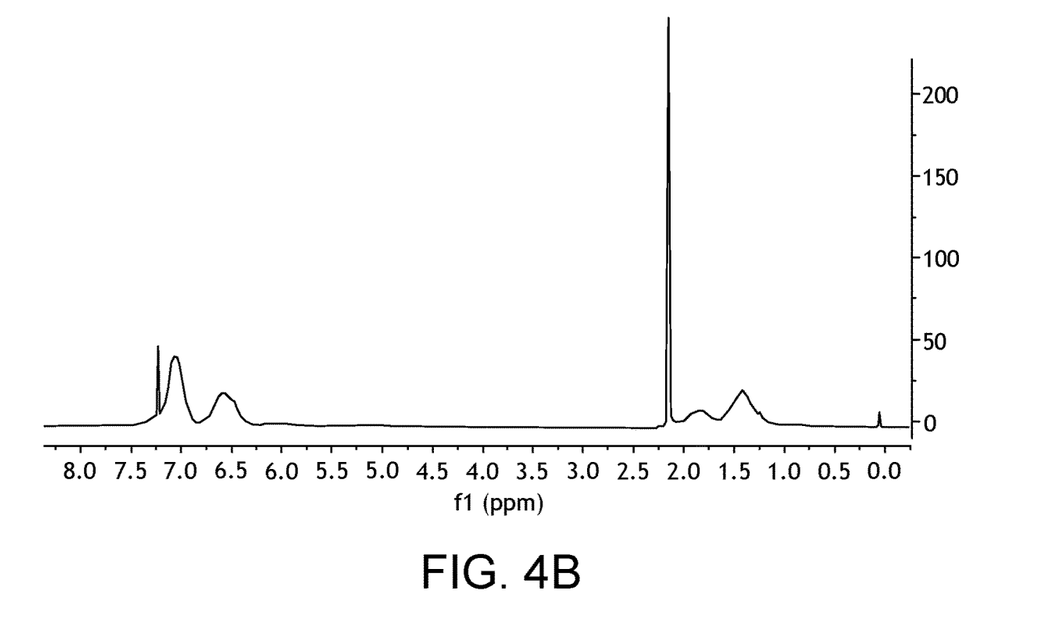
Figure 4C:
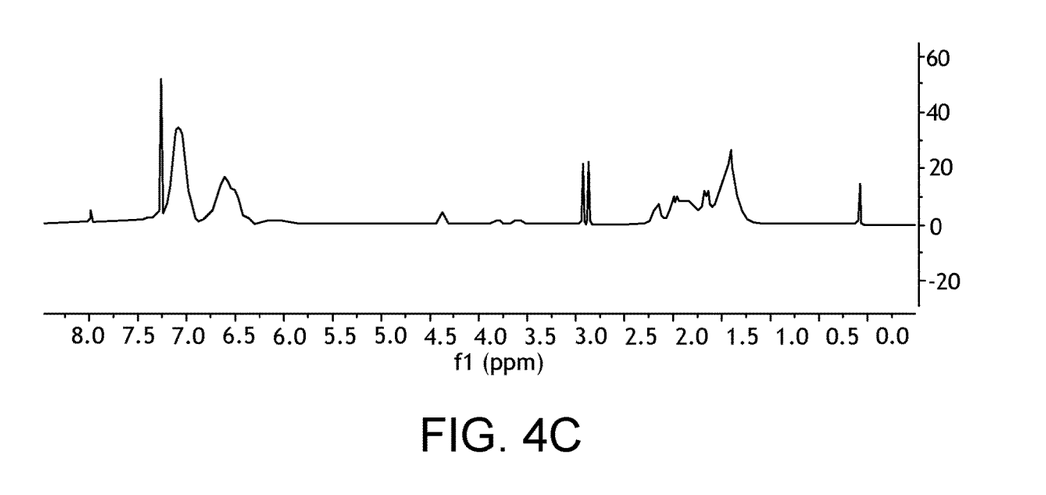
Figure 5:
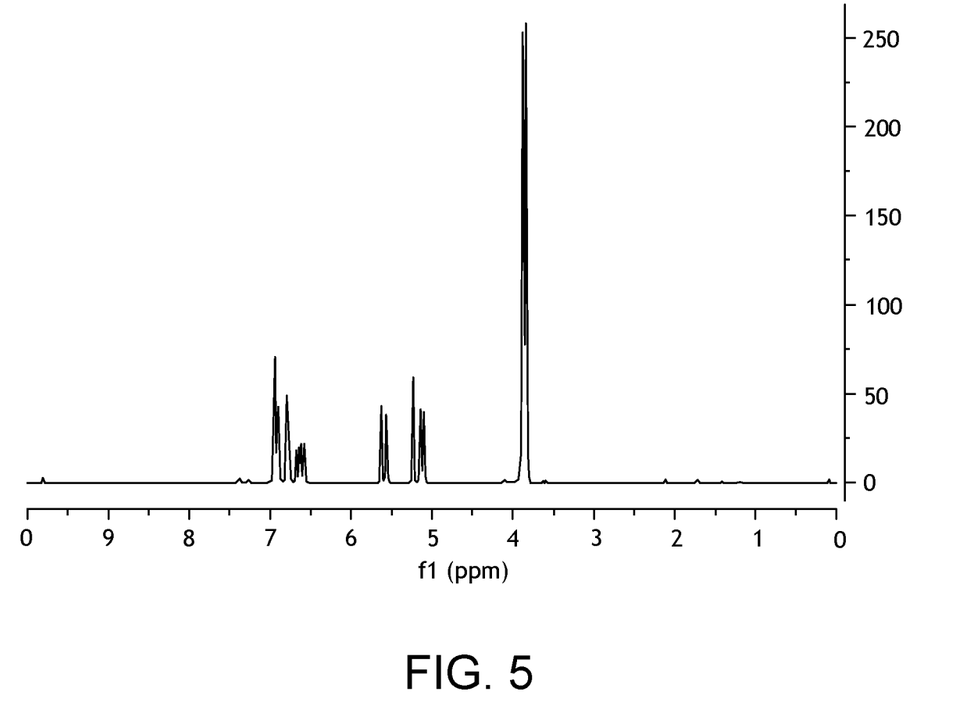
FIG. 5 shows the NMR spectrum of the 3,4-dimethoxystyrene monomer.

We have also included NMR of the polymer made by suspension polymerization (FIG. 4A). This spectrum shows the same polymer is made, but it does have more solvent peaks. In the iodocyclohexane deprotected polymer spectra (FIG. 4C), the two peaks at 2.9 ppm are residual DMF and DMF after the loss of a proton in the production of HI for the deprotection reaction. The peak at 4.4 ppm and change in the broad backbone peaks (2.3-2.0 ppm) are suggestive of residual iodate still present. Spectrum of the polymer deprotected through both $BBr_3$ (FIG. 4B) and iodocyclohexane show removal of the methoxy groups from the copolymer.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES CITED (1) Westwood, G.; Horton, T. N.; Wilker, J. J. Simplified Polymer Mimics of Cross-Linking Adhesive Proteins. Macromolecules 2007,40 (11), 3960-3964.
(2) Wilker, J. J. Redox and Adhesion on the Rocks. Nat. Chem. Biol. 2011, 7 (9), 579-580.
(3) Matos-Pérez, C. R.; White, J. D.; Wilker, J. J. Polymer Composition and Substrate Influences on the Adhesive Bonding of a Biomimetic, Cross-Linking Polymer. J. Am. Chem. Soc. 2012, 134 (22), 9498-9505.
(4) Percec, V.; Barboiu, B.; Neumann, A.; Ronda, J. C.; Zhao, M. Metal-Catalyzed "Living" Radical Polymerization of Styrene Initiated with Arenesulfonyl Chlorides. From Heterogeneous to Homogeneous Catalysis. Macromolecules 1996, 29 (10), 3665-3668.
(5) Arita, T.; Buback, M.; Janssen, O.; Vana, P. RAFT-Polymerization of Styrene up to High Pressure: Rate Enhancement and Improved Control. Macromol. Rapid Commun. 2004, 25 (15), 1376-1381.
(6) Hawker, C. J.; Bosman, A. W.; Harth, E. New Polymer Synthesis by Nitroxide Mediated Living Radical Polymerizations. Chem. Rev. 2001,101 (12), 3661-3688.
(7) Yuan, H. G.; Kalfas, G.; Ray, W. H. SUSPENSION POLYMERIZATION. J. Macromol. Sci. Part C Polym. Rev. 1991, 31 (2-3), 215-299.
(8) Ahmed, S. M. Effects of Agitation, and the Nature of Protective Colloid on Particle Size During Suspension Polymerization. J. Dispers. Sci. Technol. 1984, 5 (3-4), 421-432.
(9) Leibig, D.; Müller, A. H. E.; Frey, H. Anionic Polymerization of Vinylcatechol Derivatives: Reversal of the Monomer Gradient Directed by the Position of the Catechol Moiety in the Copolymerization with Styrene. Macromolecules 2016, 49 (13), 4792-4801.
(10) North, M.; Del Grosso, C. A.; Wilker, J. J. High Strength Underwater Bonding with Polymer Mimics of Mussel Adhesive Proteins. ACS Appl. Mater. Interfaces 2017, 9, 7866-7872.
(11) Cantergiani, E.; Brevard, H.; Krebs, Y.; Feria-Morales, A.; Amadò, R.; Yeretzian, C. Characterisation of the Aroma of Green Mexican Coffee and Identification of Mouldy/Earthy Defect. Eur. Food Res. Technol. 2001,212 (6), 648-657.
(12) Grosch, W.; Czerny, M.; Mayer, F.; Moors, A. Sensory Studies on the Key Odorants of Roasted Coffee. ACS Symp. Ser. 2000,754,202-209.
(13) Clarke, R. J. Technology III: Instant Coffee. In Coffee: Recent Developments; 2008; Vol.
(14) Bernini, R.; Crisante, F.; Ginnasi, M. C.; Bernini, R.; Crisante, F.; Ginnasi, M. C. A Convenient and Safe O-Methylation of Flavonoids with Dimethyl Carbonate (DMC). Molecules 2011, 16 (2), 1418-1425.
(15) Jenkins, C. L.; Meredith, H. J.; Wilker, J. J. Molecular Weight Effects upon the Adhesive Bonding of a Mussel Mimetic Polymer. ACS Appl. Mater. Interfaces 2013, 5 (11), 5091-5096.
(16) White, J. D.; Wilker, J. J. Underwater Bonding with Charged Polymer Mimics of Marine Mussel Adhesive Proteins. Macromolecules 2011.
(17) Handbook of Radical Polymerization; Matyjaszewski, K., Davis, T. P., Eds.; John Wiley & Sons, Inc.: Hoboken, N.J., USA, 2002.
(18) Cunningham, M. F.; Geramita, K.; Ma, J. W. Measuring the Effects of Dissolved Oxygen in Styrene Emulsion Polymerization. Polymer (Guildf). 2000, 41 (14), 5385-5392.
(19) Zuo, L.; Yao, S.; Wang, W.; Duan, W. An Efficient Method for Demethylation of Aryl Methyl Ethers. Tetrahedron Lett. 2008, 49 (25), 4054-4056.
(20) Ferhan, M.; Yan, N.; Sain, M. A New Method for Demethylation of Lignin from Woody Biomass Using Biophysical Methods. J. Chem. Eng. Process Technol. 2013, 4 (5), 1000160.

The invention claimed is:
1. A process for manufacturing a catechol-containing copolymer comprising the steps of:

a) preparing a protected 3,4-dihydroxystyrene;
b) mixing said protected 3,4-dihydroxystyrene with styrene;
c) adding an initiator of polymerization under a constant stirring to trigger polymerization of said protected 3,4-dihydroxystyrene and styrene;
d) quenching said polymerization to obtain a protected 3,4-dihydroxystyrene-styrene copolymer; and
e) removing protection from said protected 3,4-dihydroxystyrene-styrene copolymer to afford said catechol-containing copolymer.

2. The process of claim 1, which further comprises adding water between steps b) and c) to obtain a suspension.

3. The process of claim 1, wherein said initiator of polymerization is an initiator for a free radical polymerization.

4. The process of claim 3, wherein said initiator for a free radical polymerization comprises 2,2,6,6-tetramethyl-1-piperidinyloxy (TEMPO) for a nitroxide-mediated radical initiation, an arenesulfonyl chloride with a metal catalyst, an alkyl halide with a transition metal catalyst for atom transfer radical addition polymerization (ATRP), an reversible addition fragmentation chain transfer (RAFT) agent, or a ultraviolet (UV) light for initiating said free radical polymerization.

5. The process of claim 2, wherein said initiator of polymerization is an initiator for a free radical polymerization.

6. The process of claim 5, wherein said initiator for a free radical polymerization is dibenzoyl peroxide (BPO), tert-butyl peroxide, diacetyl peroxide, lauroyl peroxide, dicumyl peroxide, 2,2'-azobisizobutyronitrile (AIBN), 2,2'-azobis (2-methylpropionitrile), 2,2'-azobis (2-methyl butyronitrile), or a combination of any two or more thereof.

7. The process of claim 1, wherein 3,4-dihydroxystyrene is protected with an acetonide, a methoxy, or silyl ether.

8. The process of claim 2, wherein 3,4-dihydroxystyrene is protected with an acetonide, a methoxy, or silyl ether.

9. The process of claim 1, wherein removing protection from said protected 3,4-dihydroxystyrene-styrene copolymer is carried out with either $BBr_3$ in a compatible solvent or iodo-cyclohexane in a compatible solvent.

10. The process of claim 2, wherein removing protection from said protected 3,4-dihydroxystyrene-styrene copolymer is carried out with either $BBr_3$ in a compatible solvent or iodo-cyclohexane in a compatible solvent.

11. The process of claim 1, wherein a molar ratio of said protected 3,4-dihydroxystyrene to styrene ranges from about 1:100 to 100:1.

12. The process of claim 2, wherein a molar ratio of said protected 3,4-dihydroxystyrene to styrene ranges from about 1:100 to 100:1.

13. The process of claim 1, wherein said initiator of polymerization is an initiator for an anionic polymerization.

14. The process of claim 13, wherein said initiator for an anionic polymerization is an organolithium reagent.

15. The process of claim 14, wherein said organolithium reagent is n-butyllithium, sec-butyllithium, or tert-butyllithium.

16. The process of claim 1, wherein said initiator of polymerization is an initiator for a cationic polymerization.

17. The process of claim 16, wherein said initiator for a cationic polymerization is a Lewis acid, an organic or an inorganic one.

18. The process of claim 17, wherein said Lewis acid comprises $AlCl_3$, $BF_3$, $SnCl_4$, $SbCl_5$, $ZnCl_2$, $TiCl_4$, or an organometallic derivative thereof.

* * * * *